United States Patent
Bacardi et al.

Patent Number: 5,505,885
Date of Patent: Apr. 9, 1996

[54] GRANULATION OF PHOSPHORUS PENTASULFIDE WITH A PREDETERMINED REACTIVITY

[76] Inventors: Jean M. Bacardi, 205 Augusta National Ct., Frankling, Tenn. 37064; Robert L. Camerer, 444 Pine St., Eldred, Ill. 62027; Andrew M. Huey, Rte. 11, Box 66-S; Arthur R. Shirley, Jr., Rte. 7, Box 182, both of Florence, Ala. 35630

[21] Appl. No.: 84,373

[22] Filed: Jun. 29, 1993

[51] Int. Cl.⁶ .................... B29B 9/00; B29B 9/12
[52] U.S. Cl. ............... 264/7; 264/37; 264/40.6; 264/117; 423/303
[58] Field of Search ............. 264/7, 40.1, 40.6, 264/37, 117; 423/303

[56] References Cited

U.S. PATENT DOCUMENTS

| | | | |
|---|---|---|---|
| T980,005 | 3/1979 | Shirley, Jr. ............... | 264/7 |
| 3,023,086 | 2/1962 | Robota . | |
| 3,146,069 | 8/1964 | Robota . | |
| 3,380,808 | 4/1968 | Niermann et al. . | |
| 3,800,028 | 3/1974 | Robota et al. ............ | 423/303 |
| 3,877,415 | 4/1975 | Blouin . | |
| 3,903,333 | 9/1975 | Shirley, Jr. et al. . | |
| 4,173,621 | 11/1979 | Krause et al. . | |
| 4,213,924 | 7/1980 | Shirley, Jr. ............... | 264/7 |
| 4,248,602 | 2/1981 | Niermann et al. . | |
| 4,419,104 | 12/1983 | Niermann et al. . | |
| 4,424,176 | 1/1984 | Shirley, Jr. et al. ........ | 264/7 |
| 4,507,335 | 3/1985 | Mathur ................... | 427/215 |
| 4,686,115 | 8/1987 | Majer .................... | 427/212 |
| 4,732,745 | 3/1988 | Diskowski et al. ......... | 423/303 |
| 4,842,790 | 6/1989 | Nunnelly ................. | 264/117 |

*Primary Examiner*—Robert A. Dawson
*Attorney, Agent, or Firm*—John A. Shedden; Paul J. Juettner; Katherine L. Stewart

[57] ABSTRACT

Uniform, free-flowing, non-friable $P_2S_5$ granules having a predetermined reactivity can be produced by accretion by spraying molten $P_2S_5$ onto cascading, smaller solid particles of $P_2S_5$. The process can be used to produce any reactivity grade of $P_2S_5$ by adjusting processing conditions. The process can also be used to produce $P_2S_5$ in a form suitable for bulk shipping.

9 Claims, 2 Drawing Sheets

GRANULATION OF PHOSPHORUS PENTASULFIDE WITH A PREDETERMINED REACTIVITY

BACKGROUND

1. Field of the Present Invention

The present invention relates to the solidification of phosphorus pentasulfide by an accretion-type granulation process in order to produce a free-flowing, non-friable product with selective, consistent reactivity.

2. Description of the Prior Art

Accretion-type granulation has been successfully utilized in the production of fertilizers and pharmaceutical products. Accretion granulation is generally conducted by increasing the size of small seed particles through the gradual external addition by coating or fusion of like material in the form of concentrated solutions and/or melts. The granulation process normally utilizes a rotating drum or pan which is designed to form a cascading bed or curtain of undersized seed particles onto which a solution or molten material is sprayed. The important characteristics of a multiple-layered accreted granule are its high hardness, high sphericity, and resistance to form dust.

In U.S. Pat. No. 4,686,115, Majer, improving upon the layering-type granulation process for fertilizers, acknowledges that accretion granulation produces higher hardness, lower tendency to powder, lower tendency to being crushed, and higher sphericity than other granulation methods. In U.S. Pat. No. 4,842,790, Nunnelly describes an improved accretion process that further increases the strength or hardness of the granule and also further decreases its friability. The purpose of Nunnelly's invention is the prevention of fracturing and dust formation and thus the improvement of the bulk handling characteristics.

It is known that granulated fertilizers can be produced by accretion granulation which are free-flowing, anti-caking, non-friable, etc. It is also known that a dustless, granular product will readily mix with a liquid whereas dust and small particles tend to float on the top of the liquid.

Granulation by accretion has never before been used in the production of $P_2S_5$, according to the prior art and as indicated by current industry technology.

Prior solidification methods for $P_2S_5$ consist of bulk casting, water-cooled screw granulation, and rotary drum flaking. The latter two methods are followed by milling as part of the production process whereas the cast material is generally milled at the user's facility. The rate of cooling $P_2S_5$ during the solidification step directly affects the product's crystalline (or amorphous) structure, and thus affects its reactivity. Commercial $P_2S_5$ is characterized by the rate at which it will react with alcohols to produce dialkyl thiophosphoric acids; the term "reactivity" as used herein describes this rate of reaction in terms of the amount of temperature rise per minute. Each of these methods results in a different range of reactivity because the cooling rates vary significantly. A gap in the reactivity range exists between screw-granulated $P_2S_5$, which typically has a reactivity ranging from 0° to 2.0° C./min, and flaked $P_2S_5$, which typically has a reactivity ranging from 3.0° to 7.0° C./min. Users have expressed a need for a reactivity between 2° and 3° C./min, as well as a desire for reactivities greater than 7° C./min.

Several attempts have been made to produce reactivities in this intermediate range and in the extremely high range. Efforts have also been made to predetermine the reactivity, that is, to control the $P_2S_5$ solidification or post-solidification process in order to produce specific values of desired reactivity. These attempts have been successful in their intended goals, but their deficiencies are apparent.

U.S. Pat. No. 3,146,069 and U.S. Pat. No. 3,380,808 teach that annealing highly reactive, flaked $P_2S_5$ will produce a product that will have a lower, specific reactivity based on the time and temperature of annealing. U.S. Pat. No. 4,419,104 teaches lowering the reactivity of flaked material by controlling the cooling rate of the solidified $P_2S_5$ through a temperature range well below the transition zone (i.e., 207° C. to 160° C.). A predetermined, intermediate reactivity $P_2S_5$ product can be prepared, according to U.S. Pat. No. 4,248,602, which teaches that blending low reactivity and high reactivity solid $P_2S_5$ in quantitative proportions will achieve this end without each component of the mixture reacting successively.

U.S. Pat. No. 3,023,086 teaches that controlling the rate of cooling through the transition zone (i.e., 280° C. to 260° C.) is the most important factor in controlling, or predetermining, reactivity. In order to produce a higher reactivity $P_2S_5$, U.S. Pat. No. 4,173,621 applies this concept in a unique way. During drum flaking (or a similar rapid-cooling process), the upper, molten $P_2S_5$-layer is separated immediately from the lower, solidified $P_2S_5$-layer which has cooled extremely rapidly because it is in direct contact with the cooling surface. The upper layer is recycled to the melt and the lower, solidified layer is collected as the highly reactive product. In another attempt to produce highly reactive $P_2S_5$, U.S. Pat. No. 3,800,028 describes a method in which $P_2S_5$ vapor is rapidly cooled and condensed to a powder product.

While these methods succeed in producing a predetermined reactivity, an intermediate reactivity, an extremely high reactivity, or a combination of these often desirable qualities, none of the methods is flexible enough or wide-reaching enough to encompass all three of these qualities. In addition, none of them result in a product of the inherent consistency of a product produced by accretion. In all three of the prior methods of solidifying $P_2S_5$, the portion of material in closest contact with the cooling medium cools much faster and thus has a different reactivity than the more slowly-cooled portion which is insulated from the cooling source. This insulating phenomenon is the primary reason why the resulting reactivity of $P_2S_5$ produced by these methods is so unpredictable and the methods thus call for innovative ways to predetermine the reactivity by annealing, post-transition cooling, blending, and removing and recycling layers on the cooling roller.

The present invention teaches a solidification method that does not require any additional steps after the actual solidification step in order to improve the product reactivity. The new process of the invention can also produce very low or very high reactivity $P_2S_5$, depending on the controlled process conditions.

SUMMARY OF THE PRESENT INVENTION

It has surprisingly been found that a consistent $P_2S_5$ product can be prepared with predetermined reactivity and desirable flow characteristics. In accordance with the invention, this can be achieved by spraying molten $P_2S_5$ onto an active moving mass of solid $P_2S_5$ particles and thus allowing thin (e.g., microthin) layers of the molten material to solidify on the moving particles at a controlled rate to provide a controlled reactivity. The mass of particles is recycled through the molten spray zone until the desired product granule size is reached. The relative temperatures and particle sizes of the molten spray droplets and of the active solid particles are the primary determinants of the reactivity, sphericity, friability, and general quality of the final product. By cooling and solidifying the microthin layers at the same rate, uniformity is obtained.

Surprisingly, it has also been found that the production of a controlled, accretion-type granulation $P_2S_5$ can be prepared that has a selective reactivity which, because of the layering effect, is consistent throughout each granule.

DETAILED DESCRIPTION OF THE DRAWINGS

Figure 2:
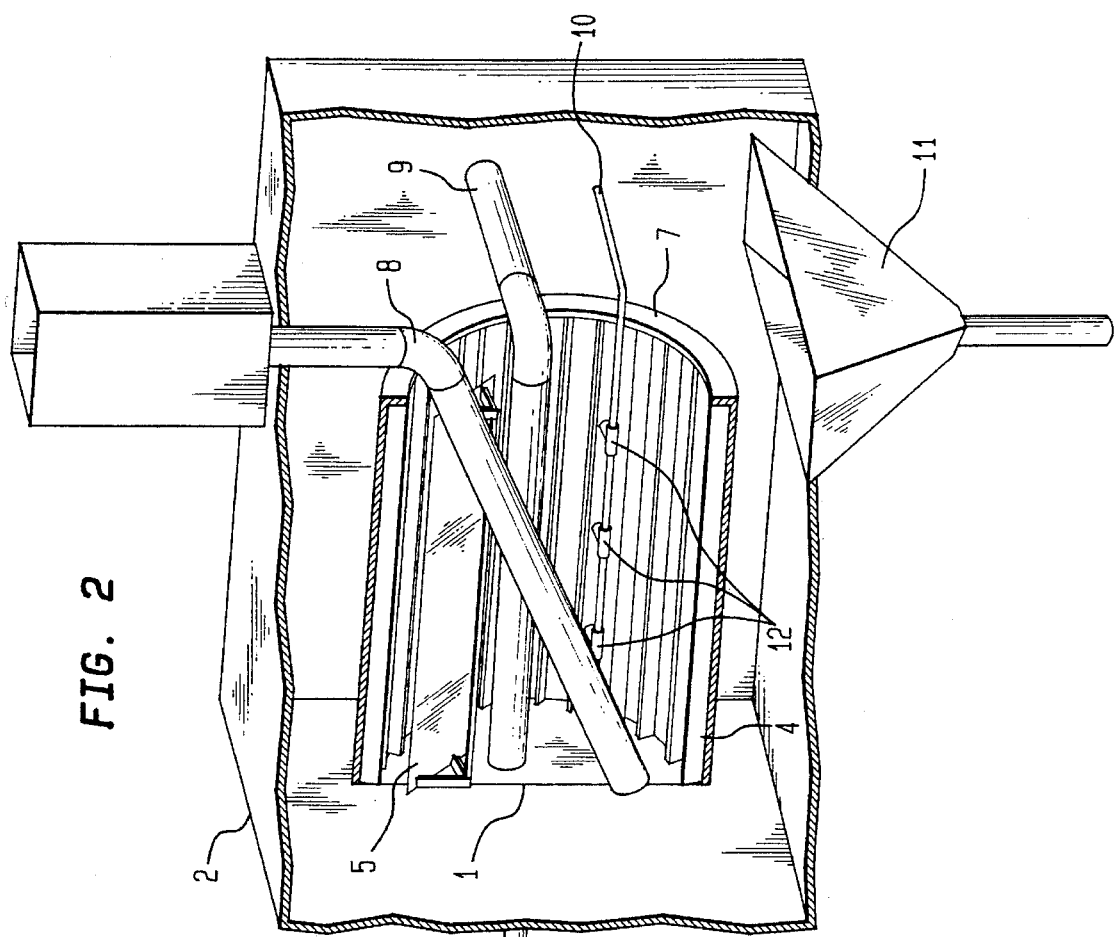
Figure 1:
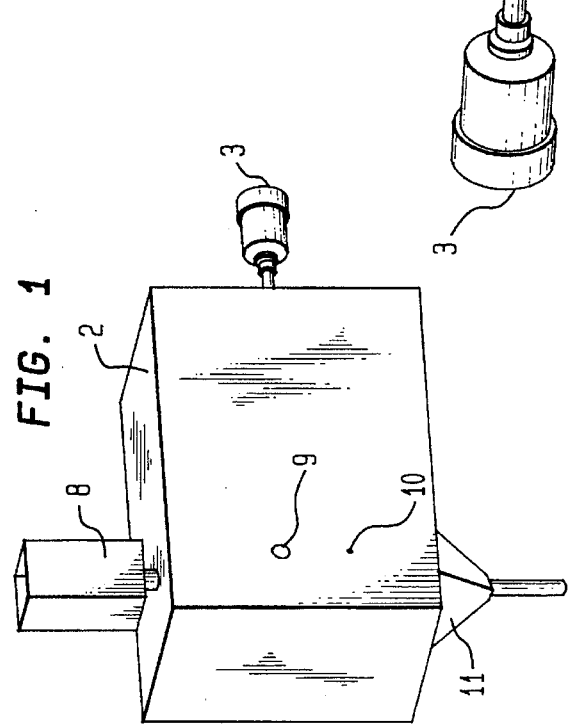
Figure 3:
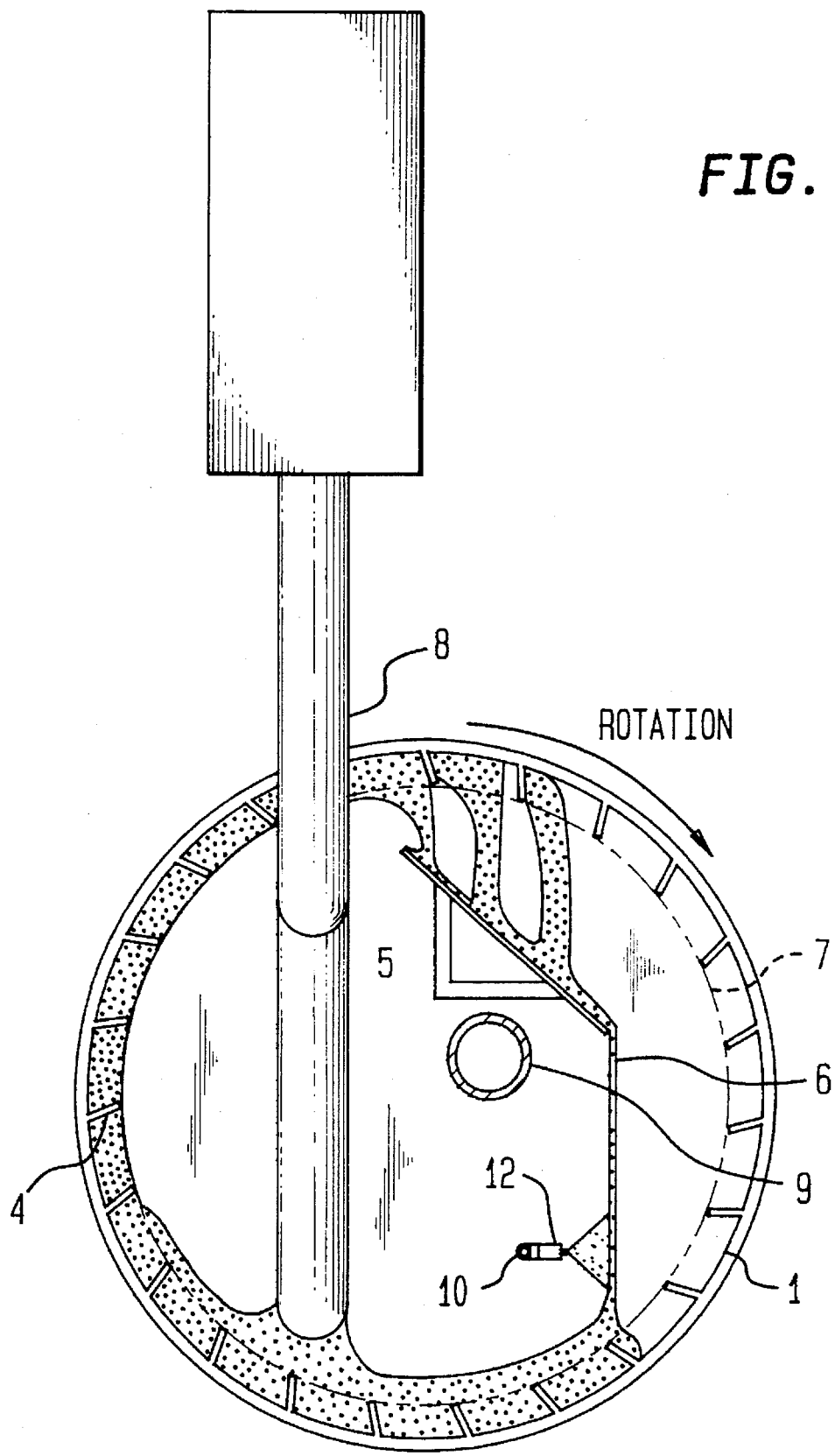

FIG. 1 is a schematic representation of the equipment used in Examples 2, 3, and 4 whereas FIG. 2 is a cutaway of the apparatus of FIG. 1 and FIG. 3 is a cross-section of the drum shown in FIG. 1, which Figures are described in Example 2.

DETAILED DESCRIPTION OF THE PRESENT INVENTION

The material treated in the invention is phosphorus pentasulfide, generically depicted $P_2S_5$, is not a pure compound but a mixture of phosphorus sulfides, predominantly $P_2S_5$. The term "phosphorus pentasulfide" as used herein is intended to relate to these materials generically.

A variety of types of equipment can be used in connection with the invention to generate the active mass of flowing $P_2S_5$ particles, also referred to as the "bed." A rotating drum (with or without interior flights), a rotating pan, a fluid bed, or anything that causes the particles to move at a sufficient velocity to cause them to free-fall in an inert gas space is adequate, and the current invention is not limited to any of these. As those familiar with the manufacturing of this compound know, the equipment interior must be blanketed with an inert gas so that the $P_2S_5$ does not come in contact with oxygen. It has been found that a rotating pan, such as described in Example 1 below, is more preferable to a fluid bed for this application. Most preferable is a rotating drum fixed with interior flights and containing an inclined pan which forms a thin, uniform curtain of the falling material. The speed of rotation of the drum or pan is adjusted along with other critical parameters (mentioned below) in order to optimize granule smoothness, sphericity, and reactivity. A rapidly rotating bed will result in smoother, rounded granules, but excessive bed velocities can cause fracturing as well as poor solidification of the molten spray onto the granules.

The initial bed of $P_2S_5$ particles can be comprised of solid material (made by any conventional method) that has been milled and screened to a particle size range that is between about 800 to about 2500 microns smaller than the desired final product granule size. After the initial bed is established, the necessary bed volume can be replenished by milling oversized granules, by sufficient over-spraying of the molten material, or a combination of the two. The amount of oversized and over-sprayed material generated depends upon the processing conditions.

The bed material/granules exiting the rotating equipment can be screened into three fractions: product size, oversize, and undersize. The granules that have reached product size can be cooled to an acceptable temperature for bulk storage and then packaged or stored. The yield of granular product to molten material sprayed into the bed ranges from between about 85% to about 95%, depending on the processing conditions. The oversized granules which have reached a size that is too large for the product range can be milled and stored until they are needed to replenish the bed volume. Oversized granules can comprise from about 5% to about 15% of the exiting material, depending on the processing conditions. The undersized granules termed "recycle" herein, can be fed directly back into the equipment generating the active bed. The rate of recycle feed can be varied in order to adjust the bed temperature and residence time and thus control the product granule quality.

The molten $P_2S_5$ can be sprayed through heated insulated hydraulic nozzles onto the active bed. The hydraulic nozzles can be attached to a manifold extending the length of the drum to spray molten $P_2S_5$ onto the falling curtain of cascading $P_2S_5$ particles. The distance from the nozzle tips to the cascading particles can be adjusted to optimize the droplet size and droplet temperature at the moment it contacts the solid particle, which is also at a controlled temperature. The spray droplet size can be controlled so that it is in proper ratio to the size of the bed particles. It has been found that the ratio of median volume diameter of the droplets to the mean particle diameter of the solid particles preferably ranges between about 0.8 and about 0.35 and more preferably between about 0.15 and about 0.30. Selection of an appropriate nozzle orifice size primarily determines the spray droplet size, but the droplet size can also be affected by spray pressure.

The temperature of the molten spray can be controlled anywhere between the $P_2S_5$ melting point (280° C.) and a temperature practical for operating purposes, about 420° C. The more preferable temperature range, however, ranges from about 320° C. to about 370° C. Within this range, the $P_2S_5$ material is well above its freezing point yet low enough to freeze satisfactorily on the active particles. The most preferable temperature ranges from about 335° C. to about 350° C. It has been found that, within this range, line and nozzle freezing problems can be minimized and $P_2S_5$ dust formation almost eliminated by keeping the product below its critical vapor pressure.

The temperature differential between the molten spray and the solid, active particles in the bed significantly affects the quenching rate and thus the reactivity of the $P_2S_5$ granules. The quenching rate is directly proportional to the rate of reactivity. Reactivities within any range, such as between about 1° to about 12° C./min. and preferably from about 2° to about 10° C./min. can be obtained by the process of the invention. It has been found that the more preferable temperature range for the active particles, given the molten spray temperatures above, ranges from about 65° C. to about 160° C. The energy contained in the molten $P_2S_5$ spray is partially dissipated through the walls of the equipment and partially absorbed by the material in the bed itself which exits the drum at the recycle rate. The remainder of the heat can be removed at a controlled rate via a stream of inert gas. The stream of inert gas can be subsequently cooled and recycled through the granulating equipment or a constant fresh supply provided, but this may be less economical in many circumstances. The temperature of the $P_2S_5$ bed can be precisely controlled by regulating the flow rate and/or temperature of the cooling gas stream. This gas can be comprised of argon, carbon dioxide, nitrogen, or a mixture of two or more of these, but the present invention is not limited to any of these.

The following examples are intended to illustrate the process of the present invention. As used herein the term "mesh" as it relates to sieve sizes refers to Tyler Standard Scale Sieves.

EXAMPLE 1

A pan with a diameter of 20 inches (50.8 centimeters) and a depth of 5 inches (12.7 centimeters) rotating at 12 RPM was used to generate an active bed of $P_2S_5$ seed material. The pan contained forty, 1-inch (2.54 centimeters) wide interior flights pitched at 45 degrees. The pan also had a 2-inch (5.08 centimeter) wide lip on the open end to contain the moving material. The particle size of the seed (conventionally solidified by water-cooled screw granulation) ranged from about −10 to about +14 Tyler mesh (−1680 to +1190 microns).

Conventional $P_2S_5$ (from same production lot as the seed material) was melted to a temperature of 299°–310° C. and sprayed at 250 psi (17.23 bar) through a hydraulic nozzle which had been preheated to 315°–343° C. The nozzle tip, which was positioned 4 to 6 inches (10.16 to 15.24 centimeters) from the bed, had an equivalent orifice opening of 0.031 in (0.079 centimeters). The approximate flow rate of the molten material was 5 lb/min (2.268 kilograms/min.).

Periodically, the operation was stopped and the bed material was screened and the undersized particles (less than 10 mesh or 1680 microns) were returned to the pan. (There was no continuous recycle fed to the pan.) The bed volume was replenished as needed with crushed, oversized (greater than 10 mesh or 1680 microns) granules.

The product granules were classified according to Tyler mesh size and tested for reactivity according to a standard procedure using isopropyl alcohol (IPA). The reactivity of the −10/+14 (−1680/+1190 micron) granules was 1.76° C./min. The reactivity was determined by measuring the total temperature rise in °C. over time in minutes of 100 milliliters of isopropanol in a stoppered dry "Dewar" flask starting at a stable temperature of 25.0° C. +/−0.5° C. to which has been quickly added 36.0 grams of $P_2S_5$ from a nitrogen or argon atmosphere while under agitation. Reactivity is computed by the equation: Total Temperature Rise (T) / Total Time (t) equals Reactivity in °C./Min.

EXAMPLE 2

Reference is made to FIGS. 1, 2 and 3 which are schematic drawings of the apparatus used in this and the following example. FIG. 2 is a cutaway of the apparatus of FIG. 1 and FIG. 3 is a cross-section of the drum described in connection with FIG. 2.

A drum [1] with an inside diameter of 3 ft. (0.9144 meter) and a length of 4 ft. (1.22 meter) was utilized for a pilot-scale production of $P_2S_5$ granules. The rotating drum was situated within a stationary enclosure [2] with the shaft supporting the drum extending through the wall of the enclosure and attached to motive power means [3]. The shaft had a mechanical seal to prevent inleakage of air and/or emission of the $P_2S_5$ vapor and dust into the atmosphere.

The drum, which had 25 interior flights [4] that were 3 inches (7.62 centimeter) wide and a 30 degree pitch, rotated at 12–13 RPM. A stationary, inclined pan [5], which extended the interior length of the drum, was positioned to direct the solid $P_2S_5$ particles falling off of the flights into a uniform curtain [6] of particles (see FIG. 3). The motive power means end of the drum was closed (the shaft contained a mechanical seal) and the other end was open except for a 3-inch (7.62 centimeter) wide retaining ring [7] across the opening to contain the rotating particles.

Through this open end, a 4-inch (10.16 centimeter) recycle feed pipe [8], a 4-inch (10.16 centimeter) nitrogen cooling header [9], and a ½-inch (1.27 centimeter) molten $P_2S_5$ spray header [10] entered the drum. The spray header was of common design comprising for each spray head a tee fitting from the feed pipe, a coupling, and a spray nozzle [Model TP 400033 from Spraying Systems Company] surrounded by a heat source having a thermocouple for controlling temperature. The entire device was insulated. The recycle, which was fed continuously using a volumetric feeder, was discharged at the back of the drum, and the processed granules exited over the retaining ring [7] at the open end of the drum through a chute [11] that extended outside the enclosure. The nitrogen header, which blew cooling inert gas onto the falling curtain of particles, also extended the length of the drum. The heated spray header contained three, hydraulic nozzles [12] spaced evenly along the length of the curtain.

The $P_2S_5$ seed material used to charge the drum initially had been solidified by a drum flaker, milled, and screened to a particle size range of −14 to +24 Tyler mesh (−1190/+710 micron). $P_2S_5$ from the same production lot was melted and used for the molten feed material.

The molten $P_2S_5$ was maintained at approximately 360° C. and was sprayed at 400 psi (27.58 bar) onto the falling curtain of particles. The nozzle tips, which were positioned 4 inches (10.16 centimeter) from the curtain of solid particles, had an equivalent orifice opening of 0.015 inches (0.038 centimeter). The approximate flow rate from each nozzle was 50 lb/hr. (22.68 kg./hr.). The bed was maintained at approximately 118° C. by controlling the flow rate of nitrogen onto the curtain.

The granules exiting the front of the drum were continuously screened into oversize (granules greater than 9 Tyler mesh or +2000 micron) which was stored for later use, product (granules −9 to +12 Tyler mesh or −2000/+1410 micron) which was tested and packaged, and undersize (granules smaller than 12 Tyler mesh or less than 1410 micron) which was continuously recycled back to the drum at 450 lb/hr. (204.1 kg./hr.). In this example, the 360° C. spray temperature resulted in enough over-spray (actually $P_2S_5$ vapor condensed and solidified to dust) so that the process self-generated sufficient bed material and so that adding crushed oversized granules was not necessary. The −9/+12 Tyler mesh (−2000/+1410 micron) product granules, tested according to the standard IPA procedure, had a reactivity of 7.66° C./min.

EXAMPLE 3

$P_2S_5$ granules were made by the accretion-type process described in Example 2 except that the following parameters were varied:

The molten $P_2S_5$ was maintained at approximately 338° C. and sprayed at a pressure of 300 psi (20.68 bar). The bed temperature was controlled at 143° C. The −9/+12 Tyler mesh (−2000/+1410 micron) granules, tested according to the standard IPA procedure, had a reactivity of 9.03° C./min.

EXAMPLE 4

$P_2S_5$ granules were made by the accretion-type process described in Example 2 except that the following parameters were varied:

The molten $P_2S_5$ was maintained at approximately 343° C. and sprayed at a pressure of 400 psi (27.58 bar). The bed temperature was controlled at 157° C. The −9/+12 Tyler mesh (−2000/+1410 micron) granules, tested according to the standard IPA procedure, had a reactivity of 6.55° C./min.

The foregoing examples illustrate certain embodiments of the claimed invention, but should not be construed in a limiting sense. Other examples run according to the process of the invention will also demonstrate a direct correlation between the operating parameters (e.g., spray temperature, bed temperature, spray pressure/droplet size) and reactivity.

What is claimed is:

1. A process for the granulation of phosphorus pentasulfide ($P_2S_5$) yielding a product or predetermined reactivity comprising spraying molten $P_2S_5$ in the presence of an inert gas onto an active mass of particles which is solid $P_2S_5$ or a combination of solid $P_2S_5$ and an inert material.

2. A process as recited in claim 1 wherein the active mass of particles is formed by a cascading bed or a falling curtain of $P_2S_5$ particles or a combination thereof.

3. A process as recited in claim 1 wherein the product has a reactivity within the range of from about 1.0 to about 12° C./min.

4. A process as recited in claim 2 wherein a rotating drum having interior lifting courses lifts the $P_2S_5$ particles and creates the cascading bed or falling curtain of particles.

5. A process as recited in claim 4 wherein the reactivity of the $P_2S_5$ is predetermined by the variation of the temperature of the molten spray, the temperature of the cascading/falling particles, the median particle diameter of the molten spray, the median particle diameter of the cascading/falling particles, or any combination of these parameters.

6. A process as recited in claim 1 where the temperature of the molten $P_2S_5$ spray ranges between about 280° C. and about 420° C. and the temperature of the active mass of particles ranges from about 65° C. and about 160° C.

7. A process as recited in claim 6 where the ratio of the median volume diameter of the molten spray droplets to the mean particle diameter of the active mass of $P_2S_5$ ranges from about 0.8 to about 0.35.

8. A process as recited in claim 5 where the temperature of the cascading/falling particles is controlled by removing absorbed heat with the flowing, inert gas.

9. A process as recited in claim 5 wherein the initial bed of $P_2S_5$ solid particles is formed of particles having a particle size form about 800 to about 2500 microns smaller than the desired final product particle size.

* * * * *